United States Patent
Ma et al.

(10) Patent No.: US 9,424,886 B1
(45) Date of Patent: Aug. 23, 2016

(54) HARD DISK DEVICE AND TEMPERATURE ALARM CIRCUIT OF HARD DISK DEVICE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Song Ma, Shenzhen (CN); Cheng-Fei Weng, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/754,096

(22) Filed: Jun. 29, 2015

(30) Foreign Application Priority Data

May 11, 2015 (CN) .......................... 2015 1 0235272

(51) Int. Cl.
*G11B 33/08* (2006.01)
*G11B 33/10* (2006.01)
*G11B 33/14* (2006.01)

(52) U.S. Cl.
CPC ............. *G11B 33/10* (2013.01); *G11B 33/144* (2013.01)

(58) Field of Classification Search
CPC . G11B 25/043; G11B 33/08; G11B 33/1453; G11B 5/3136; G11B 2005/0021; G11B 5/314; G11B 27/34; G11B 15/10; G11B 33/144
USPC .............. 360/31, 97.12, 125.74, 125.75, 137
See application file for complete search history.

(56) References Cited

U.S. PATENT DOCUMENTS 7,837,110 B1 * 11/2010 Hess .................. G06K 7/08
235/449

* cited by examiner

*Primary Examiner* — Nabil Hindi
(74) *Attorney, Agent, or Firm* — ScienBiziP, P.C.

(57) ABSTRACT

A hard disk device includes a main body and a temperature alarm circuit. The temperature alarm circuit includes a temperature detecting module detecting an internal temperature of the hard disk device, a control chip electrically coupled to the temperature detecting module to receive the internal temperature and configured to compare the internal temperature with a first preset temperature and a second preset temperature, a voltage pull-up module electrically coupled to the control chip, and an alarm module electrically coupled to the voltage pull-up module. The control chip outputs a control signal to the voltage pull-up module, the voltage pull-up module pulls up voltage of the control signal, and transmits the voltage pulled up control signal to the alarm module, and the alarm module alarms, in event that the internal temperature is higher than or equal to the first preset temperature or less than or equal to the second preset temperature.

16 Claims, 2 Drawing Sheets

HARD DISK DEVICE AND TEMPERATURE ALARM CIRCUIT OF HARD DISK DEVICE

FIELD

The subject matter herein generally relates to hard disk devices, and particularly to a hard disk device with a temperature alarm circuit.

BACKGROUND

If temperature of a hard disk device is too high or too low, the hard disk device may be damaged.

BRIEF DESCRIPTION OF THE DRAWINGS

Implementations of the present technology will now be described, by way of example only, with reference to the attached figures.

DETAILED DESCRIPTION

Figure 1:
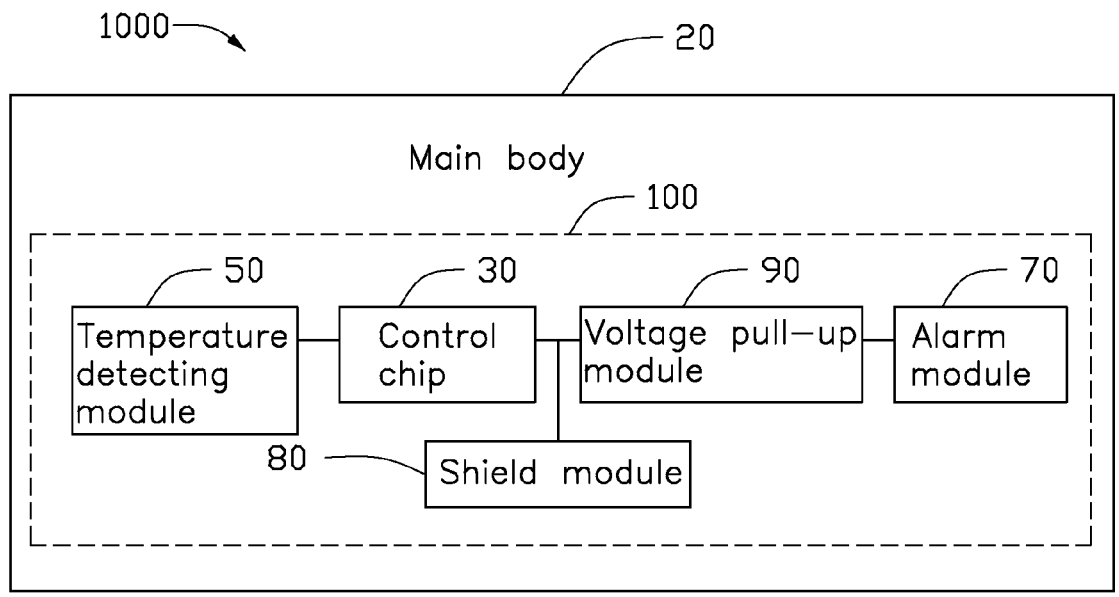
FIG. 1 is a block diagram of an embodiment of a hard disk device, wherein the hard disk device comprises a temperature alarm circuit.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently coupled or releasably coupled. The term "comprising" means "including, but not necessarily limited to"; it specifically indicates open-ended inclusion or membership in a so-described combination, group, series and the like.

The present disclosure is described in relation to a hard disk device.

FIG. 1 illustrates an embodiment of a hard disk device 1000. The hard disk device 1000 comprises a main body 20 and a temperature alarm circuit 100 installed in the main body 20. The temperature alarm circuit 100 comprises a control chip 30, a temperature detecting module 50, an alarm module 70, a voltage pull-up module 90, and a shield module 80. The control chip 30 is electrically coupled to the temperature detecting module 50 and the shield module 80, and electrically coupled to the alarm module 70 through the voltage pull-up module 90. The shield module 80 further is electrically coupled to the voltage pull-up module 90. The temperature detecting module 50 is available to detect internal temperature of the hard disk device 1000 when the hard disk device 1000 operates, and to transmit the internal temperature of the hard disk device 1000 to the control chip 30. The control chip 30 receives the internal temperature from the temperature detecting module 50, and outputs a control signal to the voltage pull-up module 90, according to the internal temperature. The voltage pull-up module 90 receives the control signal from the control chip 30, pulls up voltage of the control signal, and transmits the voltage pulled up control signal to the alarm module 70. The alarm module 70 alarms. The shield module 80 is available to shield the control signal output from the control chip 30, to make the alarm module 70 not alarm. In at least one embodiment, the temperature detecting module 50 is a temperature sensor.

Figure 2:
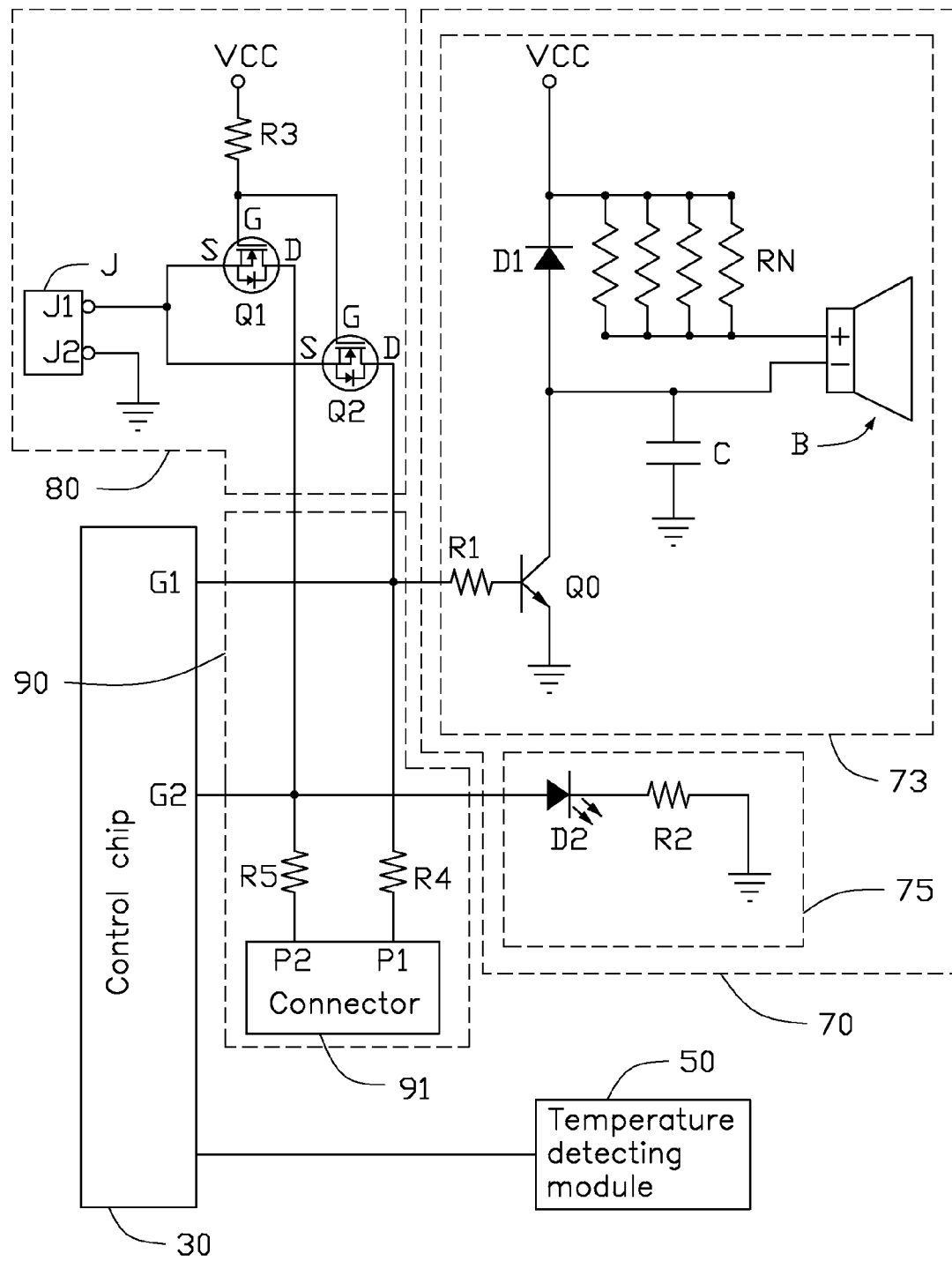
FIG. 2 is a circuit diagram of the temperature alarm circuit of FIG. 1.

FIG. 2 illustrates an embodiment of the temperature alarm circuit 100. The alarm module 70 comprises a first alarm unit 73 and a second alarm unit 75.

The first alarm unit 73 comprises an electronic switch Q0, a diode D1, a resistor R1, a resistor unit RN, a capacitor C, and a buzzer B. The electronic switch Q0 comprises a first terminal electrically coupled to a first output pin G1 of the control chip 30 through a resistor R1, a second terminal electrically coupled to a ground, and a third terminal electrically coupled to an anode of the diode D1. The third terminal of the electronic switch Q0 is electrically coupled to a ground terminal of the buzzer B, and further electrically coupled to the ground through the capacitor C. A cathode of the diode D1 is electrically coupled to a power supply VCC. A power supply terminal of the buzzer B is electrically coupled to the power supply VCC through the resistor unit RN. In at least one embodiment, the electronic switch Q0 is a NPN-type bipolar junction transistor (BJT), the first terminal, the second terminal, and the third terminal of the electronic switch Q0 are respectively corresponding to the base, the emitter, and the collector of the NPN-type BJT. The resistor unit RN comprises a plurality of resistors connected in parallel between the power supply VCC and the power supply terminal of the buzzer B.

The second alarm unit 75 comprises a light emitting diode D2 and a resistor R2. An anode of the light emitting diode D2 is coupled to a second output pin G2 of the control chip 30, and a cathode of the light emitting diode D2 is electrically coupled to the ground through the resistor R2.

In at least one embodiment, the first alarm unit 73 is available to alarm by the buzzer B, and the second alarm unit 75 is available to alarm by the light emitting diode D2.

In other embodiments, the first alarm unit 73 and the second alarm unit 75 can be replaced by other alarm components, such as a display unit etc., and the electronic switch Q0 can be an n-channel metal-oxide semiconductor field-effect transistor (NMOSFET) or other suitable switch having similar functions.

The shield module 80 comprises two electronic switches Q1 and Q2, a resistor R3, and a jumper J. The jumper J comprises a first conduction terminal J1 and a second conduction terminal J2. A first terminal G of the electronic switch Q1 is electrically coupled to the power supply VCC through the resistor R3, a second terminal S of the electronic switch Q1 is electrically coupled to the first conduction terminal J1 of the jumper J, and a third terminal D of the electronic switch Q1 is electrically coupled to the anode of the light emitting diode D2. A first terminal G of the electronic switch Q2 is electrically coupled to the first terminal G of the electronic switch Q1, a second terminal S of the electronic switch Q2 is coupled to the second terminal S of the electronic switch Q1, and a third terminal D of the electronic switch Q2 is coupled to the first terminal of the electronic switch Q0 through the resistor R1. The second conduction terminal J2 of the jumper J is electrically coupled to the ground. In at least one embodiment, each of the electronic switches Q1 and Q2 is an NMOSEFT, the first terminal G, the second terminal S, and the third terminal D of the electronic switch Q1 are respectively corresponding to the gate, the source, and the drain of the NMOSEFT, and the first terminal G, the second terminal S, and the third terminal D of the electronic switch Q2 are respectively corresponding to the gate, the source, and the drain of the NMOSEFT. In other embodiments, each of the electronic switches Q1 and Q2 can be an NPN-type BJT or other suitable switch having similar functions.

The voltage pull-up module 90 comprises a connector 91 and two resistors R4 and R5. The connector 91 comprises two power supply pins P1 and P2. The power supply pin P1 is electrically coupled to the first output pin G1 of the control chip 30 through the resistor R4, and the power supply pin P2 is electrically coupled to the second output pin G2 of the control chip 30 through the resistor R5. In at least one embodiment, the connector 20 is a connector of a hard disk device 1000, the power supply pins P1 and P2 are two idle and 3.3V power supply pins of the connector of the hard disk device 1000.

In at least one embodiment, the control chip 30 is provided with a first preset temperature and a second preset temperature, the first preset temperature can be 60 degrees centigrade and the second preset temperature can be 5 degrees centigrade. The temperature detecting module 50 is available to detect internal temperature of the hard disk device 1000 when the hard disk device 1000 operates, and to transmit the internal temperature of the hard disk device 1000 to the control chip 30. The control chip 30 compares the internal temperature with the first preset temperature and the second preset temperature, and outputs control signals from the first output pin G1 and the second output pin G2 according to the comparison result.

In use, the connector 91 is electrically coupled to a main board of an electronic device, such as a computer or a server, in order to make the hard disk device 1000 communicate with the electronic device. When the internal temperature detected by the temperature detecting module 50 is higher than or equal to the first preset temperature, the first output pin G1 and the second output G2 of the control chip 30 output high level control signals, such as logic 1, to the voltage pull-up module 90. The voltage pull-up module 90 pulls up voltage of the high level control signals, and transmits the voltage pulled up high level signals to the first terminal of the electronic switch Q0 and the anode of the light emitting diode D2. The electronic switch Q0 is turned on, the ground terminal of the buzzer B is grounded by the electronic switch Q0, and the buzzer B sounds. The light emitting diode D2 is lit, to indicate that the internal temperature of the hard disk device 1000 is not normal.

When the internal temperature detected by the temperature detecting module 50 is less than or equal to the second preset temperature, the first output pin G1 and the second output G2 of the control chip 30 output high level control signals, such as logic 1, to the voltage pull-up module 90. The voltage pull-up module 90 pulls up voltage of the high level control signals, and transmits the voltage pulled up high level signals to the first terminal of the electronic switch Q0 and the anode of the light emitting diode D2. The electronic switch Q0 is turned on, the ground terminal of the buzzer B is grounded by the electronic switch Q0, and the buzzer B sounds. The light emitting diode D2 is lit, to indicate that the internal temperature of the hard disk device 1000 is not normal.

When the internal temperature detected from the temperature detecting module 50 is greater than the second preset temperature and less than the first preset temperature, the first output pin G1 and the second outputting G2 of the control chip 30 output low level control signals, such as logic 0, the electronic switch Q0 is turned off. The buzzer B does not sound and the light emitting diode D2 is not lit, to indicate that the internal temperature of the hard disk device 1000 is normal.

When the alarm function of the alarm module 70 is needed to be shielded, the first conduction terminal J1 is electrically coupled to the second conduction terminal J2. The second terminal S of the electronic switch Q1 is electrically coupled to the ground through the jumper J, and the second terminal S of the electronic switch Q2 is electrically coupled to the ground through the jumper J. The first output pin G1 of the control chip 30 is electrically coupled to the ground through the electronic switch Q2 and the jumper J, and the second output pin G2 is electrically coupled to the ground through the electronic switch Q1 and the jumper J. At this time, voltage of the control signals output from the first output pin G1 and the second output G2 of the control chip 30 whether at a high level or a low level, will be pulled down to a low level by the shield module 80. That is, the control signals output from the control chip 30 are shielded by the shield module 80. The first terminal of the electronic switch Q0 is electrically coupled to the ground, and the anode of the light emitting diode D2 is electrically coupled to the ground, and the buzzer B does not sound and the light emitting diode D2 is not lit.

The internal temperature of the hard disk device 1000 is detected by the temperature detecting module 50, and the internal temperature of the hard disk device 1000 is transmitted to the control chip 30. When the internal temperature is higher than or equal to the first preset temperature or less than or equal to the second preset temperature, the control chip 30 controls the first alarm unit 73 and the second alarm unit 75 to alarm, to indicate that the internal temperature of the hard disk device 100 is not normal.

Even though numerous characteristics and advantages of the embodiments have been set forth in the foregoing description, together with details of the structure and function of the embodiments, the present disclosure is illustrative only, and changes may be made in detail, including in the matters of shape, size, and arrangement of parts within the principles of the embodiments to the full extent indicated by the broad general meaning of the terms in which the appended claims are expressed.

What is claimed is:

1. A temperature alarm circuit for a hard disk device, the temperature alarm circuit comprising:
 a temperature detecting module configured to detect an internal temperature of the hard disk device;
 a control chip electrically coupled to the temperature detecting module and configured to receive the internal temperature and compare the internal temperature with a first preset temperature and a second preset temperature;
 a voltage pull-up module electrically coupled to the control chip, wherein the control chip outputs a control signal to the voltage pull-up module; and
 an alarm module electrically coupled to the voltage pull-up module, wherein the alarm module alarms, in event that the internal temperature is higher than or equal to the first preset temperature or less than or equal to the second preset temperature;

wherein the voltage pull-up module pulls up voltage of the control signal, and transmits the voltage pulled up control signal to the alarm module.

2. The temperature alarm circuit for the hard disk device of claim 1, wherein the voltage pull-up module comprises a connector and a first resistor, the connector comprises a first power supply pin, the control chip comprises a first output pin, the alarm module comprises a first alarm unit, the first output pin of the control chip is electrically coupled to the first alarm unit, the first output pin of the control chip is further electrically coupled to the first power supply pin through the first resistor; when the internal temperature is higher than or equal to the first preset temperature or less than or equal to the second preset temperature, the control signal outputting from the control chip is at a high level, the voltage pull-up module pulls up voltage of the control signal and transmits the voltage pulled up control signal to the first alarm unit, and the first alarm unit alarms.

3. The temperature alarm circuit for the hard disk device of claim 2, wherein the first alarm unit comprises:

a first electronic switch, a diode, and a buzzer, the first electronic switch comprises a first terminal electrically coupled to the first output pin of the control chip, a second terminal electrically coupled to a ground, and a third terminal electrically coupled to an anode of the diode, the buzzer comprise a ground terminal electrically coupled to the third terminal of the first electronic switch, and a power supply terminal electrically coupled to a first power supply, a cathode of the diode is electrically coupled to the first power supply, the first terminal of the first electronic switch receives the voltage pulled up control signal from the voltage pull-up module, the first electronic switch is turned on, and the buzzer sounds, in event that the internal temperature is higher than or equal to the first preset temperature or less than or equal to the second preset temperature.

4. The temperature alarm circuit for the hard disk device of claim 3, wherein the power supply terminal of the buzzer is electrically coupled to the first power supply through a resistor unit, and the resistor unit comprises a plurality of resistors connected in parallel.

5. The temperature alarm circuit for the hard disk device of claim 3, further comprising a shield module, wherein the shield module comprises a second electronic switch and a jumper, the jumper comprising a first conduction terminal and a second conduction terminal electrically coupled to the ground, the second electronic switch comprises a first terminal electrically coupled to a second power supply, a second terminal coupled to the first conduction terminal of the jumper, and a third terminal electrically coupled to the first output pin of the control chip, when the first conduction terminal is electrically coupled to the second conduction terminal, the first output pin of the control chip is electrically coupled to the ground, the first electronic switch is turned off, and the buzzer does not sound.

6. The temperature alarm circuit for the hard disk device of claim 5, wherein the voltage pull-up module further comprises a second resistor, the connector comprises a second power supply pin, the control chip further comprises a second output pin, the alarm module further comprises a second alarm unit, the second output pin of the control chip is electrically coupled to the second alarm unit, the second output pin of the control chip is further electrically coupled to the second power supply pin of the connector; when the internal temperature is higher than or equal to the first preset temperature or less than or equal to the second preset temperature, the control signal outputting from the second output pin of the control chip is at a high level, the voltage pull-up module pulls up voltage of the control signal and transmits the voltage pulled up control signal to the second alarm unit, and the second alarm unit alarms.

7. The temperature alarm circuit for the hard disk device of claim 6, wherein the second alarm unit comprises a light emitting diode, an anode of the light emitting diode is electrically coupled to the second output pin of the control chip, the cathode of the light emitting diode is grounded, when the internal temperature is higher than or equal to the first preset temperature or less than or equal to the second preset temperature, the anode of the light emitting diode receives the control signal having high voltage, the light emitting diode is lit.

8. The temperature alarm circuit for the hard disk device of claim 7, wherein the cathode of the light emitting diode is grounded through a resistor.

9. The temperature alarm circuit for the hard disk device of claim 6, wherein the shield module further comprises a third electronic switch, the third electronic switch comprises a first terminal electrically coupled to the second power supply, a second terminal electrically coupled to the first conduction terminal of the jumper, and a third terminal electrically coupled to the second output pin of the control chip, when the first conduction terminal is electrically coupled to the second conduction terminal, the second output pin of the control chip is electrically coupled to the ground, the light emitting diode is not lit.

10. A hard disk device, comprising:

a main body; and a temperature alarm circuit installed in the main body, comprising:

a temperature detecting module configured to detect an internal temperature of the hard disk device;

a control chip electrically coupled to the temperature detecting module and configured to receive the internal temperature and compare the internal temperature with a first preset temperature and a second preset temperature;

a voltage pull-up module electrically coupled to the control chip, wherein the control chip outputs a control signal to the voltage pull-up module; and an alarm module electrically coupled to the voltage pull-up module, wherein the alarm module alarms, in event than the internal temperature is higher than or equal to the first preset temperature or less than or equal to the second preset temperature;

wherein the voltage pull-up module pulls up voltage of the control signal, and transmits the voltage pulled up control signal to the alarm module.

11. The hard disk device of claim 10, wherein the voltage pull-up module comprises a connector and a first resistor, the connector comprises a first power supply pin, the control chip comprises a first output pin, the alarm module comprises a first alarm unit, the first output pin of the control chip is electrically coupled to the first alarm unit, the first output pin of the control chip is further electrically coupled to the first power supply pin through the first resistor; when the internal temperature is higher than or equal to the first preset temperature or less than or equal to the second preset temperature, the control signal outputting from the control chip is at a high level, the voltage pull-up module pulls up voltage of the control signal and transmits the voltage pulled up control signal to the first alarm unit, and the first alarm unit alarms.

12. The hard disk device of claim 11, wherein the first alarm unit comprises:
a first electronic switch, a diode, and a buzzer, the first electronic switch comprises a first terminal electrically coupled to the first output pin of the control chip, a second terminal electrically coupled to a ground, and a third terminal electrically coupled to an anode of the diode, the buzzer comprise a ground terminal electrically coupled to the third terminal of the first electronic switch, and a power supply terminal electrically coupled to a first power supply, a cathode of the diode is electrically coupled to the first power supply, the first terminal of the first electronic switch receives the voltage pulled up control signal from the voltage pull-up module, the first electronic switch is turned on, and the buzzer sounds, in event that the internal temperature in higher than or equal to the first preset temperature or less than or equal to the second preset temperature.

13. The hard disk device of claim 12, further comprising a shield module, wherein the shield module comprises a second electronic switch and a jumper, the jumper comprising a first conduction terminal and a second conduction terminal electrically coupled to the ground, the second electronic switch comprises a first terminal electrically coupled to a second power supply, a second terminal coupled to the first conduction terminal of the jumper, and a third terminal electrically coupled to the first output pin of the control chip, when the first conduction terminal is electrically coupled to the second conduction terminal, the first output pin of the control chip is electrically coupled to the ground, the first electronic switch is turned off, and the buzzer does not sound.

14. The hard disk device of claim 13, wherein the voltage pull-up module further comprises a second resistor, the connector comprises a second power supply pin, the control chip further comprises a second output pin, the alarm module further comprises a second alarm unit, the second output pin of the control chip is electrically coupled to the second alarm unit, the second output pin of the control chip is further electrically coupled to the second power supply pin of the connector; when the internal temperature is higher than or equal to the first preset temperature or less than or equal to the second preset temperature, the control signal outputting from the second output pin of the control pin of the control chip is at a high level, the voltage pull-up module pulls up voltage of the control signal and transmits the voltage pulled up control signal to the second alarm unit, and the second alarm unit alarms.

15. The hard disk device of claim 14, wherein the second alarm unit comprises a light emitting diode, an anode of the light emitting diode is electrically coupled to the second output pin of the control chip, the cathode of the light emitting diode is grounded, when the internal temperature is higher than or equal to the first preset temperature or less than or equal to the second preset temperature, the anode of the light emitting diode receives the control signal having high voltage, the light emitting diode is lit.

16. The hard disk device of claim 15, wherein the shield module further comprises a third electronic switch, the third electronic switch comprises a first terminal electrically coupled to the second power supply, a second terminal electrically coupled to the first conduction terminal of the jumper, and a third terminal electrically coupled to the second output pin of the control chip, when the first conduction terminal is electrically coupled to the second conduction terminal, the second output pin of the control chip is electrically coupled to the ground, the light emitting diode is not lit.

* * * * *